United States Patent Office

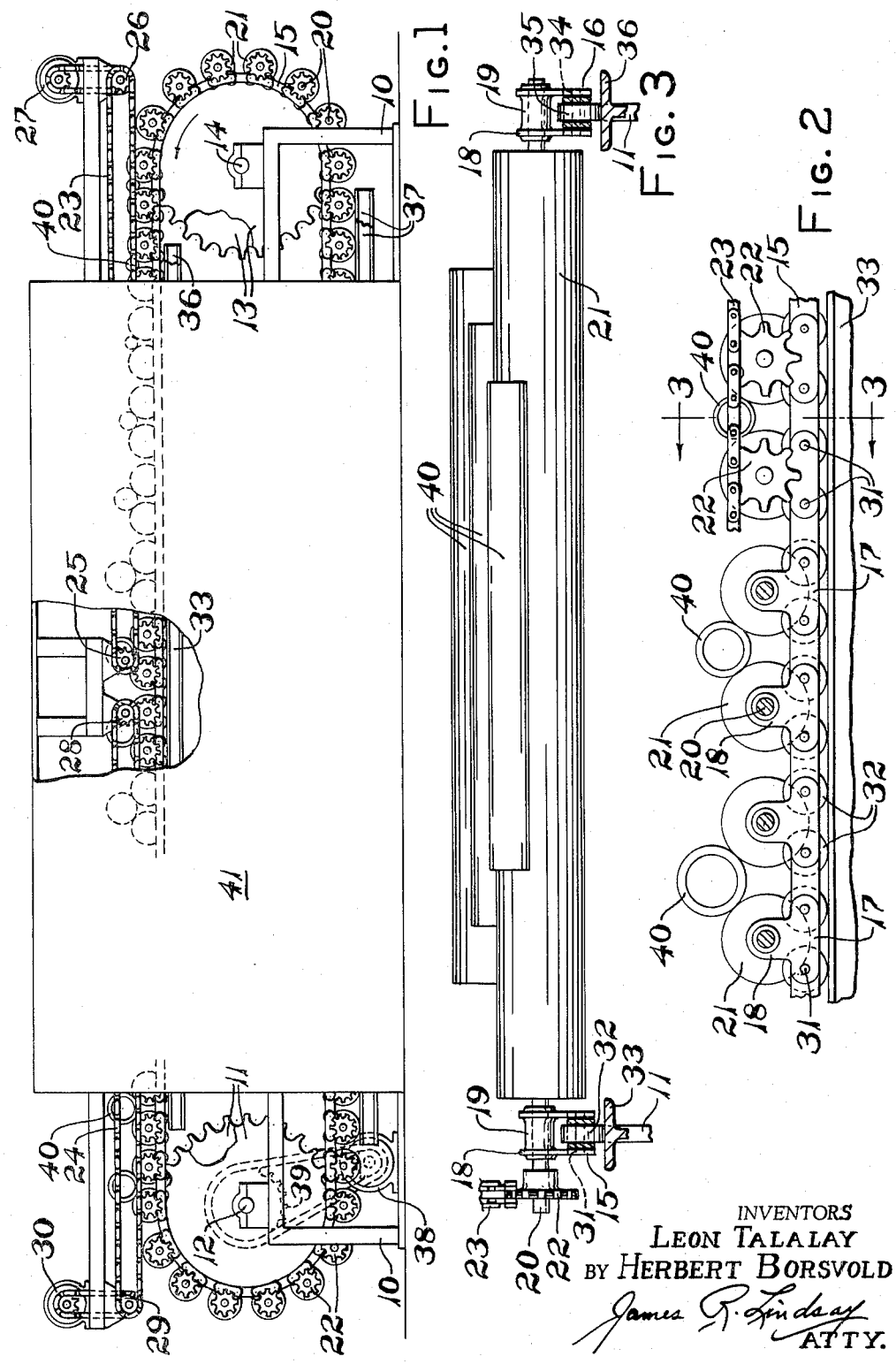

3,210,449
Patented Oct. 5, 1965

3,210,449
PROCESS AND APPARATUS FOR MAKING A CYLINDRICAL-SHAPED CELLULAR RUBBER STRIP
Leon Talalay, New Haven, and Herbert H. Borsvold, Orange, Conn., assignors to The B. F. Goodrich Company, New York, N.Y., a corporation of New York
Filed Apr. 8, 1963, Ser. No. 271,425
10 Claims. (Cl. 264—54)

This invention relates to the manufacture of gas-expanded cellular rubber products and pertains more particularly to apparatus and a process for making cylindrical shaped products of cellular rubber or similar materials.

Although various manufacturing techniques may be employed for making sponge rubber, the process most widely used for expanding rubber into a cellular material involves the use of a chemical blowing agent uniformly dispersed in the rubber, the blowing agent evolving a gas when heated to moderate temperature. Whether the chemically blown rubber has an interconnecting cellular structure (open-cell sponge) or is composed of non-communicating cells (closed-cell sponge) depends largely upon the physical properties of the rubber composition at the time it is expanded. If the unexpanded rubber composition has little strength and is sufficiently plastic an intercommunicating cellular structure normally will be formed. In making a closed cell gas-expanded cellular rubber, the rubber composition before it is blown is partially vulcanized at a temperature below that at which the blowing agent evolves a gas in order to strengthen the composition and prevent the rupture of the cell walls when the composition is expanded.

The adaptation of the above procedure in forming cylindrical-shaped products of cellular rubber (cylindrical-shaped tubing, for example) has presented certain difficulties, particularly when such products are desired to be formed without employing an actual molding procedure. When a strip of expandable rubber composition is heated to cause the rubber composition to expand, the composition attempts to expand in all directions, i.e., lengthwise, in width and in height. If the composition is resting upon a flat support surface, unrestricted expansion in all directions is prevented, however, due to the frictional engagement of the strip with the supporting surface. A distortion results. The product, having softened during the heating operation, also tends to flatten to a generally oval cross-section that has a flat face formed where the strip rested on the supporting surface. The present invention overcomes these difficulties and permits a cylindrical-shaped cellular rubber product free of noticeable distortion to be conveniently and economically formed.

In accordance with this invention, a rubber composition containing a chemical blowing agent is formed into a cylindrical-shaped strip and while being supported on a pair of revolving parallel rolls is heated to expand and vulcanize the rubber composition, the cylindrical-shaped strip being revolved continuously during the expansion and vulcanization of the rubber composition by the revolving supporting rolls. The strip of rubber composition supported on the pair of revolving rolls makes only tangential contact with the revolving rolls so that at any one time essentially the entire strip is free to expand without restriction in any direction. The continuous revolving of the cylindrical-shaped strip around its longitudinal axis continuously changes the points of contact of the strip of rubber compound with the supporting rolls so that any selected fragmental area of the strip does not remain in contact with the supporting rolls for more than a brief moment. As a consequence, the rubber composition can expand essentially in all directions without experiencing objectionable restricting forces. The continuous revolving of the cylindrical-shaped strip of rubber composition also assists in preventing the flattening of the strip to one of oval cross-section.

The term "rubber" used herein is to be construed broadly wherever the text will permit and includes natural rubber, such as caoutchouc (which is a rubbery polymer of isoprene) and the like, and synthetic rubber, such as the rubbery polymers of open-chained conjugated diolefins having from 4 to 8 carbon atoms exemplified by butadiene-1,3; 2,3-dimethyl butadiene-1,3; 1,4-dimethylbutadiene-1,3 and the like, or the copolymers of these and similar materials with each other or with such copolymerizable monomeric ethylenic materials as styrene, methyl acrylate, methyl methacrylate, ethyl acrylate, ethyl methacrylate, acrylonitrile, isobutylene, and the like, or the rubbery polymers of such dienes as chloroprene and the like, and such materials as vinyl chloride polymers, for example, polyvinyl chloride (a homopolymer of vinyl chloride), copolymers of vinyl chloride with vinyl acetate, copolymers of vinyl chloride with vinylidene chloride and copolymers of vinyl chloride with maleic acid esters. In fact, it will be clear that the process of this invention is useful in forming a cylindrical-shaped cellular product of any sponge-forming composition which is thermoplastic prior to its expansion into a cellular structure but which after its expansion is or can be converted (such as by vulcanization) into a material that at room temperature (20° C.) is not subject to noticeable plastic flow but will retain its general shape when not subjected to external forces. Appropriate fillers, softeners, accelerators, antioxidants, reinforcing pigments, vulcanizing agents, etc., in addition to the chemical blowing agent may be incorporated into the composition to impart desired characteristics thereto.

Any of the chemical blowing agents which are compatible with the rubber and evolve a gas when heated are suitable for use in this invention. The incorporation of the chemical blowing agent into the rubber composition is accomplished in the normal way. Sodium bicarbonate and ammonium carbonate are commonly used blowing agents for making chemically blown rubber and may be used in this invention, although chemical blowing agents which evolve a gas less soluble in rubber than carbon dioxide preferably are employed. Nitrogen liberating blowing agents such as diazoaminobenzene, dinitroso pentamethylenetetramine and 1,3-bis(o-xenyl)-triazine have proven particularly useful in making chemically blown rubber. The amount of blowing agent which should be added to the rubber composition varies depending mainly upon the physical characteristics of the rubber composition and the properties desired in the finished product.

If a closed-cell structure is to be formed the rubber is partially vulcanized or precured before it is blown. The partial vulcanization of the rubber may be effected by adding a material to the rubber composition which will cause partial vulcanization of the rubber at a temperature below the temperature at which the blowing agent will evolve a gas. The accelerators of vulcanization or vulcanizing agents useful for this purpose are well known. "Fast curing" non-sulfur containing vulcanizing agents such as 1,3,4-trinitrobenzene, benzoyl peroxide, p-benzoquinone-monoxime, p-benzoquinone-dioxime, benzoquinone-monophenylimine, benzoquinone-bis-phenylimine and paraquinone-bis-chloroimine have been used extensively, usually together with sulfur, to effect partial vulcanization of the rubber at temperatures below the temperatures at which most commonly used blowing agents are effective. A wide variety of sulfur containing accelerators of vulcanization or vulcanizing agents are available for causing the desired partial vulcanization of the rubber. Tetramethylthiuram monosulfide, tetramethylthiuram disulfide, tetraethylthiuram disulfide, zinc dimethyldithiocarbamate, zinc diethyldithiocarbamate, selenium dimethyldithiocarbamate and selenium diethyldithiocarbamate are typical examples of sulfur containing materials which are useful for this purpose. The quantity of the accelerator of vulcanization or vulcanizing agent which should be used for effecting the partial vulcanization depends upon the degree of partial vulcanization desired. A sufficient partial vulcanization should be imparted to the rubber, when a closed-cell structure is desired, so that the composition has sufficient strength to expand without cell wall rupture.

The compounded rubber composition can be formed into a cylindrical-shaped strip by any convenient method. However, extruding the unexpanded rubber composition through an appropriately shaped die to form the cylindrical-shaped strip has been found to be the simplest way of accomplishing this end.

The invention will be fully understood by referring to the specific embodiment of the invention hereinafter described and to the drawing wherein:

FIG. 1 is a side elevational view, partly broken away, of apparatus for carrying out the process of this invention;

FIG. 2 is a fragmentary side elevational view of the apparatus shown in FIG. 1 showing in enlarged detail the manner of conveying and of rotating the cylindrical-shaped strip of rubber composition by means of rotating supporting rolls; and FIG. 3 is a section on line 3—3 of FIG. 2.

The apparatus shown in the drawing comprises a frame 10 which supports a pair of drive sprocket wheels 11, 11 mounted on shaft 12 and a pair of idler sprocket wheels 13, 13 similarly mounted on shaft 14. A chain conveyor 15 travels around one of the drive sprocket wheels 11 and its companion idler sprocket wheel 13 while a second chain conveyor 16 travels around the other drive sprocket wheel 11 and its companion idler sprocket wheel 13. The connector links 17, 17 of the chain conveyors 15 and 16 are provided with flanges 18, 18 which house bearings 19, 19 that support shafts 20, 20 upon which support rolls 21, 21 are mounted. Each shaft 20 has a sprocket wheel 22 mounted thereon which meshes with drive chain 23 and drive chain 24 as is explained in greater detail hereinafter. Drive chain 23 is disposed around idler sprocket wheel 25 and around drive sprocket wheel 26 which is driven by motor 27. Drive chain 24 travels around idler sprocket wheel 28 and drive sprocket wheel 29, drive sprocket wheel 29 being driven by motor 30.

The connecting pins 31, 31 which unite the links of chain conveyor 15 also function as axles for roller wheels 32, 32 which ride on track 33 supported by frame 10. Similarly, the connecting pins 34 which unite the links of chain conveyor 16 serve as axles for roller wheels 35 which ride on track 36 supported by frame 10. Tracks 33 and 36 are parallel to each other and support the upper reaches of chain conveyors 15 and 16 preventing sagging thereof. On the return of chain conveyors 15 and 16, rolls 21, 21 roll on and are supported by a pair of parallel support beams 37, 37 positioned beneath tracks 33 and 36.

Power for driving drive sprocket wheels 11, 11 is supplied by motor 38 to shaft 12 through sprocket wheel 39 keyed to shaft 12. As shaft 12 is revolved drive sprocket wheels 11, 11 engage chain conveyors 15 and 16 (one drive sprocket wheel 11 engaging chain conveyor 15 and the other drive sprocket wheel 11 engaging chain conveyor 16) causing chain conveyors 15 and 16 to be advanced. Since the two drive sprocket wheels are identical and the two idler sprocket wheels 13, 13 are identical and the two chain conveyors 15 and 16 are identical, chain conveyors 15 and 16 are advanced together at the same speed. As chain conveyors 15 and 16 are advanced, rolls 21, 21 which are attached in parallel relationship in the manner explained above to chain conveyors 15 and 16 also are advanced.

As rolls 21, 21 are advanced along the upper reaches of chain conveyors 15 and 16 they are revolved at a constant speed through engagement of sprocket wheels 22, 22 either with chain 23 or chain 24 (depending upon the position of the roll 21). Drive chain 23 is advanced around sprocket wheels 25 and 26 by power supplied by motor 27. By referring to FIGS. 2 and 3, it will be understood that chain 23 is advanced and meshes with the sprocket wheels 22, 22, shafts 20, 20 (and consequently the roll 21 mounted on the shaft 20) will be revolved in bearings 19, 19. As will be evident from the drawing, all of the rolls 21, 21 being driven by power supplied through drive chain 23 will be driven in the same direction. As chain conveyors 15 and 16 continue to advance rolls 21, 21, sprocket wheels 22, 22 which have been meshing with drive chain 23 disengage from drive chain 23 and become engaged with drive chain 24 which is being advanced around sprocket wheels 28 and 29 by power supplied by motor 30. The engagement of sprocket wheels 22, 22 with drive chain 24 causes the sprocket wheels so engaged to be turned by the advancing drive chain 24 and results in the revolving of the rolls 21, 21 associated with the sprocket wheels 22, 22 meshing with drive chain 24 in the same manner as these rolls 21, 21 previously were revolved by drive chain 23. It will be noted that all of the rolls 21, 21 are revolved by drive chain 24 in the same direction although this direction need not be the same as the direction of revolution imparted to rolls 21, 21 by drive chain 23. It will be understood that for a pair of rolls 21, 21 both to support and revolve a strip of material, both of the rolls will have to revolve in the same direction, i.e., when viewed in side elevation both rolls either will revolve clockwise or both rolls will revolve counterclockwise. The speed at which rolls 21, 21 are revolved can be varied by changing the speed of motors 27 and 30 which in turn varies the speed at which drive chains 23 and 24 are advanced.

While the drawing shows the use of two drive chain assemblies for revolving rolls 21, 21 during the advance of the rolls 21, 21 between sprocket wheel 13 and sprocket wheel 11, it will be understood that one drive chain assembly could be used instead or that more than two such systems could be used. In some instances, it may be desirable to provide means whereby the direction of advance of the drive chain (or chains) used for revolving rolls 21, 21 can be reversed.

As is illustrated in the drawing, rolls 21, 21 are employed to support the strips 40, 40 of rubber composition as the strips 40, 40 are conveyed through the apparatus. Consequently, the spacing between adjacent parallel supporting rolls 21, 21 must be less than the diameter of the strip 40 of rubber composition supported by the rolls 21, 21, since otherwise the strip of rubber composition would fall through the opening between the rolls 21, 21.

Since the strips 40, 40 of rubber composition, in accordance with this invention, necessarily are heated, the apparatus desirably is provided with a heat-insulating covering 41 which forms a heating chamber. Normally, the heating chamber is heated by introducing hot air into the heating chamber through one or more openings in the covering thereby creating a hot air oven through which the strips 40, 40 are advanced. As is illustrated in the drawing, as the strips 40, 40 are conveyed through the heating chamber the strips expand both in diameter and in length.

The heating chamber defined by covering 41 may be divided into zones of different temperature by suitably placed baffles or by other means. For example, in the manufacture of a closed-cell rubber product, the heating oven might be divided into four zones or sections, namely, (1) a pre-heat section, (2) a partial vulcanizing section, (3) a section in which the rubber composition expands and (4) a section in which the vulcanization of the expanded rubber composition is completed and in which normalizing takes place. The first zone (the pre-heat section) would be maintained at a temperature sufficient to soften the unvulcanized rubber composition but insufficient to cause the chemical blowing agent to evolve a gas and preferably insufficient to cause rapid vulcanization of the rubber compound. The next zone (the partial cure section) would be maintained at a temperature sufficient to partially vulcanize the rubber composition within a reasonable time to a degree of cure sufficient so that the rubber composition can be expanded without rupture of the cell walls. The temperature in this second zone is not sufficient, however, to decompose the chemical blowing agent. In the third zone the temperature is raised to a temperature at which the chemical blowing agent dispersed in the rubber composition decomposes and gives off a gas. It is in this section that expansion of the rubber composition takes place. The vulcanization of the rubber composition and normalization of the expanded rubber occurs in the fourth zone. "Normalization" of the expanded rubber composition is the process whereby excessive gases in the cells of the expanded material are permitted to diffuse from the cells. The rate of the diffusion increases as the temperature of the gases is increased. To illustrate further, a natural rubber composition containing N,N'-dimethyl-N,N'-dinitroso terephthalamide as a chemical blowing agent might be softened in the first section of the oven at a temperature of about 190° F., be partially vulcanized in the second section at a temperature of about 225° F., be expanded in the third section at a temperature of about 265° F. and be vulcanized and normalized in the fourth section at about 290° F. The dwell time in each section, for illustrative purposes, might be 5 to 8 minutes in the first section, 8 to 10 minutes in the second section, 15 to 18 minutes in the third section and 35 to 40 minutes in the final section. Of course, the optimum temperatures for the various heating zones will vary depending upon the particular rubber composition under consideration and the dwell times desired to be used in each heating zone. Similarly, the dwell times in each section will vary depending upon the particular rubber composition and the temperatures at which the various zones are maintained. Since the temperatures in the softening zone and the section in which partial vulcanization of the rubber composition is accomplished (if a closed-cell product is to be formed) should be below the temperature at which the chemical blowing agent decomposes at an appreciable rate, the decomposition temperature of the chemical blowing agent being employed will influence the temperatures in the first two zones. For most commercial heat-decomposable chemical blowing agents, a temperature between about 275 to 325° F. is sufficient in the expansion section of the heating chamber. The temperature in the section of the heating chamber in which final vulcanization and normalizing take place usually is maintained between 275° F. and 350° F.

The strips 40, 40 of rubber composition, it will be noted, only "kiss," i.e., make tangential contact with the rolls 21, 21 which support the strips 40, 40 so that essentially the entire strip of rubber composition is free to expand in any direction without restriction. As indicated above, the continual revolving of rolls 21, 21 which support the strip 40 of rubber composition causes the strip 40 itself to revolve about its longitudinal axis whereby the tangential points of contact of the strip 40 with the rolls 21, 21 continually are changed. As a result, any selected fragmental area of the strip does not remain in contact with the rolls 21, 21 which support it for more than a brief moment and the rubber composition can expand in all directions without experiencing objectionable restricting forces. The continual revolving of the cylindrical-shaped strip 40 in tangential contact with the rolls 21, 21 which support it also tends to prevent the flattening of the strip to one of oval cross-section.

Although the strips 40, 40 of rubber composition may be formed in any manner, forming the strips by extruding the rubber composition through an appropriately shaped die is perhaps the most convenient manner. The strips 40, 40 are shown to be tubular in shape. It will be understood, nevertheless, that solid cylindrical shapes can be formed also in the manner described.

Closed-cell sponge rubber tubing made in accordance with this invention has been used extensively as insulation for pipes. The insulation tube either can be slit and slipped around an installed pipe line or the tube of insulation can be pulled over the pipe without it being necessary to slit the insulation before installing a pipe in a line.

We claim:

1. The method for making a cylindrical-shaped strip of gas-expanded cellular rubber which comprises forming a cylindrical-shaped strip from a rubber composition containing a chemical blowing agent, supporting said otherwise unsupported strip of rubber composition on parallel rolls by depositing said strip of rubber composition in the trough formed between and by said rolls, the spacing between said rolls being less than the diameter of said strip of rubber composition whereby the strip of rubber composition is supported by tangential contact with said rolls, heating the strip of rubber composition while revolving said rolls in the same direction of rotation to cause said blowing agent to evolve a gas and expand the rubber composition while the strip of rubber composition is continually revolving around its longitudinal axis and in only tangential contact with the said supporting rolls so that said strip of rubber composition can expand essentially unrestricted in all directions, and further heating the said expanded strip of rubber composition while continuing to revolve said rolls in the same direction to effect vulcanization of the expanded rubber composition.

2. The method for making a cylindrical-shaped strip of gas-expanded cellular rubber which comprises forming a cylindrical-shaped strip from a rubber composition containing a chemical blowing agent, supporting said otherwise unsupported strip of rubber composition on a pair of parallel rolls by depositing said strip of rubber composition in the trough formed between and by said rolls, the spacing between said rolls being less than the diameter of said strip of rubber composition whereby the strip of rubber composition is supported by tangential contact with said rolls, heating the strip of rubber composition while revolving said rolls in the same direction of rotation to cause partial vulcanization of the rubber composition, further heating said strip of rubber composition while continuing to revolve said rolls in the same direction of rotation to cause said blowing agent to evolve a gas and expand the rubber composition while the strip of rubber composition is continually revolving around its longitudinal axis and in only tangential contact with the said pair of supporting rolls so that said strip of rubber composition can expand essentially unrestricted in all directions, and further heating the said expanded strip of rubber composition while continuing to revolve said rolls in the same direction to effect vulcanization of the expanded rubber composition.

3. The method for making a cylindrical-shaped strip of gas-expanded cellular rubber which comprises forming a cylindrical-shaped strip from a rubber composition containing a chemical blowing agent, supporting said otherwise unsupported strip of rubber composition on a pair of parallel rolls by depositing said strip of rubber composition in the trough formed between and by said rolls, the spacing between said rolls being less than the diameter of said strip of rubber composition whereby the strip of rubber composition is supported by tangential contact with said rolls, revolving said rolls in the same direction whereby said strip of rubber composition is caused to revolve around its longitudinal axis, advancing said parallel spaced revolving rolls with said strip of rubber composition supported thereon through a heating zone maintained at a temperature sufficient to cause said blowing agent to evolve a gas and expand the rubber composition, and advancing said parallel spaced revolving rolls with said expanded strip of rubber composition supported thereon through a heating zone maintained at a temperature sufficient to cause vulcanization of the expanded rubber composition.

4. The method for making a cylindrical-shaped strip of gas-expanded cellular rubber which comprises forming a cylindrical-shaped strip from a rubber composition containing a chemical blowing agent, supporting said otherwise unsupported strip of rubber composition on a pair of parallel rolls by depositing said strip of rubber composition in the trough formed between and by said rolls, the spacing between said rolls being less than the diameter of said strip of rubber composition whereby the strip of rubber composition is supported by tangential contact with said rolls, revolving said rolls in the same direction whereby said strip of rubber composition is caused to revolve around its longitudinal axis, advancing said parallel spaced revolving rolls with said strip of rubber composition supported thereon through a heating zone maintained at a temperature sufficient to cause partial vulcanization of the rubber composition and below a temperature sufficient to cause said blowing agent to evolve a gas, advancing said parallel spaced revolving rolls with the partially vulcanized strip of rubber composition supported thereon through a heating zone maintained at a temperature sufficient to cause said blowing agent to evolve a gas and expand the rubber composition, and advancing said parallel spaced revolving rolls with said expanded strip of rubber composition supported thereon through a heating zone maintained at a temperature sufficient to cause vulcanization of the expanded rubber composition.

5. The method for making a cylindrical-shaped strip of gas-expanded cellular rubber which comprises extruding a rubber composition containing a chemical blowing agent into a cylindrical-shaped strip, supporting said otherwise unsupported strip of rubber composition on a pair of parallel rolls by depositing said strip of rubber composition in the trough formed between and by said rolls, the spacing between said rolls being less than the diameter of said strip of rubber composition whereby the strip of rubber composition is supported by tangential contact with said rolls, revolving said rolls in the same direction whereby said strip of rubber composition is caused to revolve around its longitudinal axis, advancing said parallel spaced revolving rolls with said strip of rubber composition supported thereon through a heating zone maintained at a temperature sufficient to cause softening and partial vulcanization of the rubber composition and below a temperature sufficient to cause said blowing agent to evolve a gas, advancing said parallel spaced revolving rolls with the partially vulcanized strip of rubber composition supported thereon through a heating zone maintained at a temperature sufficient to cause said blowing agent to evolve a gas and expand the rubber composition, and advancing said parallel spaced revolving rolls with said expanded strip of rubber composition supported thereon through a heating zone maintained at a temperature sufficient to cause vulcanization and normalization of the expanded rubber composition.

6. Apparatus for making a cylindrical-shaped cellular rubber strip which comprises a pair of parallel rolls for supporting an otherwise unsupported strip of rubber composition having a chemical blowing agent therein in the trough formed between and by said rolls, the spacing between said rolls being less than the diameter of said strip of rubber composition whereby the strip of rubber composition is supported by tangential contact with said rolls, means for revolving said rolls in the same direction whereby said strip of rubber composition is caused to revolve around its longitudinal axis, means for advancing said pair of revolving rolls with said strip of rubber composition supported thereon through a heating zone, and means for heating said strip of rubber composition as it is being advanced through said heating zone and revolved by said rolls to cause said blowing agent to evolve a gas and expand the rubber composition and to cause vulcanization of the expanded rubber composition.

7. Apparatus for making a cylindrical-shaped cellular rubber strip which comprises a pair of parallel rolls for supporting an otherwise unsupported strip of rubber composition having a chemical blowing agent therein in the trough formed between and by said rolls, the spacing between said rolls being less than the diameter of said strip of rubber composition whereby the strip of rubber composition is supported by tangential contact with said rolls, means for revolving said rolls in the same direction whereby said strip of rubber composition is caused to revolve around its longitudinal axis, means for advancing said pair of revolving rolls with said strip of rubber composition supported thereon through a heating zone, means for heating said strip of rubber composition as it is being advanced through said heating zone and revolved by said rolls to cause said blowing agent to evolve a gas and expand the rubber composition, and means for heating the expanded strip of rubber composition as it is being advanced through said heating zone and revolved by said rolls to cause vulcanization of the expanded rubber composition.

8. Apparatus for making a cylindrical-shaped cellular rubber strip which comprises a pair of parallel rolls for supporting an otherwise unsupported strip of rubber composition having a chemical blowing agent therein in the trough formed between and by said rolls, the spacing between said rolls being less than the diameter of said strip of rubber composition whereby the strip of rubber composition is supported by tangential contact with said rolls, means for revolving said rolls in the same direction whereby said strip of rubber composition is caused to revolve around its longitudinal axis, means for advancing said pair of revolving rolls with said strip of rubber composition supported thereon through a heating zone, means for heating said strip of rubber composition as it is being advanced through said heating zone and revolved by said rolls to cause softening and partial vulcanization of the rubber composition, means for heating said partially vulcanized strip of rubber composition as it is being advanced through said heating zone and revolved by said rolls to cause said blowing agent to evolve a gas and expand the rubber composition, and means for the heating the expanded strip of rubber composition as it is being advanced through said heating zone and revolved by said rolls to cause vulcanization and normalization of the expanded rubber composition.

9. Apparatus for making a cylindrical-shaped cellular rubber strip which comprises a pair of identical chain conveyors positioned side-by-side in spaced relationship, parallel rolls disposed between and attached to said chain conveyors and disposed along the entire length of the chains thereof, a pair of adjacent rolls so disposed being employed to support an otherwise unsupported strip of rubber composition having a chemical blowing agent therein in the trough formed between and by the pair of rolls, the spacing between adjacent rolls employed to support a strip of rubber composition being less than the diameter of the strip of rubber composition whereby the strip of rubber composition is supported by tangential contact with the said supporting rolls, means for driving said chain conveyors at the same speed whereby said parallel rolls disposed between said chain conveyors are advanced through a heating zone, means for revolving a pair of said rolls supporting a strip of rubber composition in the same direction during the advance of said rolls through said heating zone, means in said heating zone to heat said strip of rubber composition as it is being revolved by the rolls supporting it to a temperature sufficient to cause said blowing agent to evolve a gas and expand the rubber composition and to cause vulcanization of the expanded rubber composition.

10. Apparatus for making a cylindrical-shaped cellular rubber strip which comprises a pair of identical chain conveyors positioned side-by-side in spaced relationship, parallel rolls disposed between and attached to said chain conveyors and disposed along the entire length of the chains thereof, a pair of adjacent rolls so disposed being employed to support an otherwise unsupported strip of rubber composition having a chemical blowing agent therein in the trough formed between and by the pair of rolls, the spacing between adjacent rolls employed to support a strip of rubber composition being less than the diameter of the strip of rubber composition whereby the strip of rubber composition is supported by tangential contact with the said supporting rolls, means for driving said chain conveyors at the same speed whereby said parallel rolls disposed between said chain conveyors are advanced through a heating zone, means for revolving a pair of said rolls in the same direction as they support a strip of rubber composition during the advance of said rolls through said heating chamber, means in said heating chamber to heat said strip of rubber composition as it is being revolved and continuously advanced by the rolls supporting it to a temperature sufficient to cause partial vulcanization of the rubber composition and below the temperature at which the chemical blowing agent evolves a gas, means in said heating chamber to heat said partially vulcanized strip of rubber composition as it is being revolved and continuously advanced by the rolls supporting it to a temperature sufficient to cause said blowing agent to evolve a gas and expand the rubber composition, and means in said heating chamber to heat the expanded strip of rubber composition as it is being revolved and continuously advanced by the rolls supporting it to a temperature sufficient to cause vulcanization of the expanded rubber composition.

References Cited by the Examiner

UNITED STATES PATENTS

| | | | |
|---|---|---|---|
| 2,331,146 | 10/43 | Slayter. | |
| 2,557,439 | 6/51 | Kmentt | 18—6 |
| 2,700,183 | 1/55 | Bosomwerth et al. | 18—6 XR |
| 2,776,450 | 1/57 | Boggs | 18—4 |
| 2,859,151 | 11/58 | Usab et al. | 18—26 XR |
| 2,904,836 | 9/59 | Jefferson et al. | 18—26 |
| 2,997,739 | 8/61 | Smith et al. | 18—6 XR |
| 3,080,606 | 3/63 | Smith et al. | 18—6 |
| 3,087,197 | 4/63 | Fuji | 18—6 XR |
| 3,121,253 | 2/64 | Varrial | 18—6 XR |

FOREIGN PATENTS

| | | |
|---|---|---|
| 466,453 | 5/37 | Great Britain. |
| 829,912 | 3/60 | Great Britain. |

ALEXANDER H. BRODMERKEL, *Primary Examiner.*